March 7, 1967

TEIZO FUJITA 3,308,404

ELECTRIC SWITCH RESPONSIVE TO PREDETERMINED
OR ABNORMAL CURRENT CONDITION

Filed Feb. 10, 1965

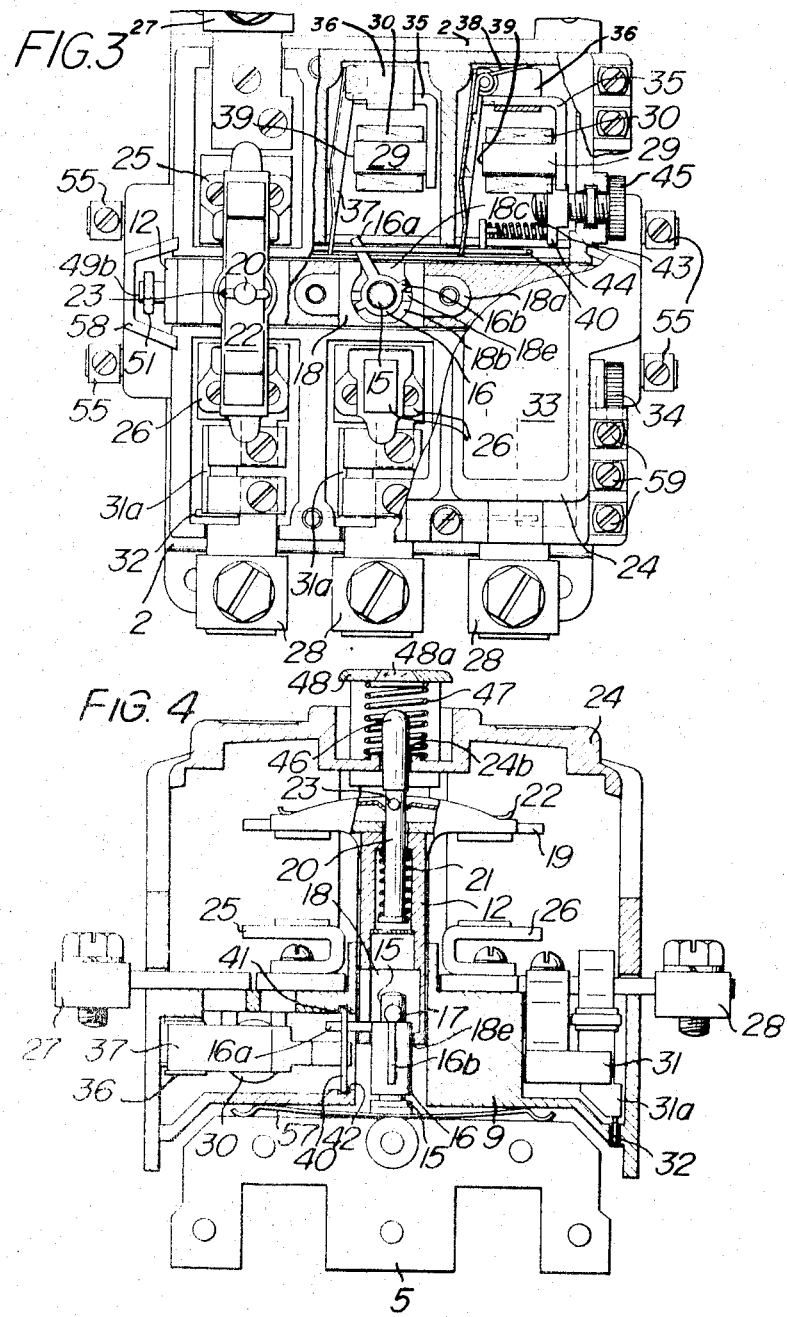

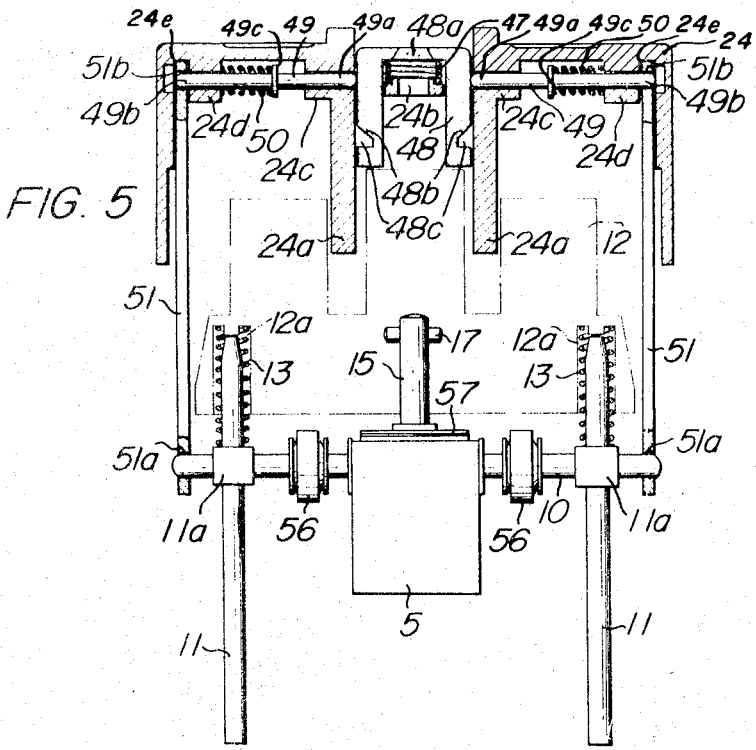

United States Patent Office 3,308,404
Patented Mar. 7, 1967

3,308,404
ELECTRIC SWITCH RESPONSIVE TO PRE-
DETERMINED OR ABNORMAL CURRENT
CONDITION
Teizo Fujita, 3—34 Naka Tezukayama, Osaka, Japan
Filed Feb. 10, 1965, Ser. No. 431,527
Claims priority, application Japan, Feb. 10, 1964,
39/6,947
3 Claims. (Cl. 335—18)

This invention relates to electric switches, and more particularly to those of highly frequent operation and long useful life, and yet capable of interrupting over or excessive current, and which also can interrupt fault current, such as short-circuit current of distribution circuits instantaneously by electro-magnetic operation, while it can open and close load circuits under normal condition with high frequentativeness by electromagnet means. According to the invention, the distribution circuit can be protected against fault current, such as short circuit current, in starting and running operations of electric motors or the like, and the electric motor can also be protected.

As has been well known, in electric switches of highly frequent operation, the contacts should be protected against damage by chattering arc, fusing, etc., as far as possible, in order to maintain long useful life, and consequently, in general, the throwing-in speed and contact opening distance are relatively small, with relatively low capacity of operating electromagnet means. This is one of the reasons why an electric switch of highly frequent operation cannot be provided with interrupting capacity above a certain limit, say 10 times its rating. For fault current interruption and extinguishment of electric arc, the stationary and movable contacts are required to move apart a certain large distance; if not, it is extremely difficult to associate therewith arc-extinguishing means. If, on the other hand, the interrupting speed of movable contact means should be raised by increasing the strength of interrupting spring means, chattering would be enhanced and the capacity of operating electromagnet means would be required to increase unnecessarily.

The electric switch of the present invention is featured by the opening speed of movable contact means which is increased selectively when over current occurs due to fault or other problems, as well as, by broadening of the open distance of contacts only at the time of fault current interruption. For this purpose, the movable iron core of magnet means normally coupled with the movable contact support during highly frequent operation is disconnected promptly from the latter upon occurrence of over current in order to decrease the mass of moving part means, and in addition, the open distance of movable contact from stationary contact is increased beyond that in the normal highly frequent operation, thus increasing the interrupting capacity only when over current occurs.

The above-described increase of the opening distance of contacts is also utilized in extremely skilled manner for indication of the switch operation.

The electric switch of the present invention is mainly for use as an electric switch of highly frequent operation, with extremely compact construction, and yet has higher interrupting capacity than heretofore known.

An object of the present invention is to provide an electric switch which is dependable for highly frequent operation under normal load condition, but upon occurrence of fault current, can operate as an instantaneously interrupting switch by disconnection of movable contact support means from the movable iron core of the operating electromagnet.

Another object of the present invention is to provide an electric switch which operates frequently under normal load condition, but upon occurrence of fault current, has an increased contact-opening distance for raising the interrupting capacity.

Another object of the present invention is to provide an electric switch having an effective indication device of switch operation by utilization of increased contact-opening distance when fault current is interrupted.

A further object of the present invention is to provide an electric switch of suitable configuration convenient for highly frequent operation normally, but which has a high interrupting capacity upon occurrence of fault current.

There are other objects and particularities of the present invention, which will be made obvious from the following description, with reference to the accompanying drawings showing an embodiment of the invention, in which;

FIG. 3 is a plan view, partly broken away;

FIG. 4 is a front elevational view, partly in longitudinal section, of essential parts, when the switch is trip operated;

FIG. 5 is a side elevational view, partly in longitudinal section, of essential parts, when the switch is reset;

FIGS. 6 and 7 are perspective views showing the rotary engagement mechanism forming part of the switch; and FIGS. 8 and 9 are perspective views of the rotor and the engagement holding mechanism proper of the same.

Figure 2:
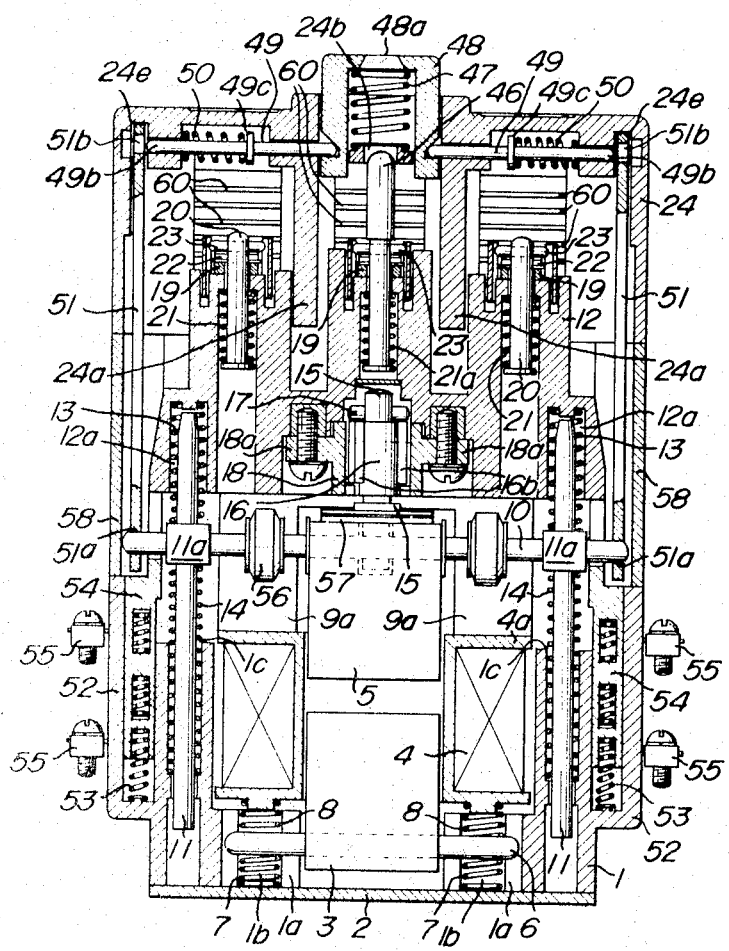
FIG. 2 is a side elevational view, partly in longitudinal section.

Referring to the figures of drawings, a casing 1 is fixed to a mounting plate 2, and accommodates therein an operating electromagnet formed by a stationary iron core 3, a magnetizing coil 4 and a movable iron core 5. As shown in FIG. 2, a supporting shaft 6 is mounted transversely penetrating through the lower portion of stationary core 3 in lamination direction, and the opposite ends of shaft 6 are slidably engaging in guide grooves 1a provided inside the casing 1 in longitudinal directions, respectively. Guide grooves 1a are respectively provided with spring inserting holes 1b in longitudinal directions perpendicular to the supporting shaft 6. The springs 7 and 8 are disposed midway of respective guide grooves 1a, being inserted into holes 1b with the end portions of shaft 6 held therebetween, the lower springs 7 being disposed between the shaft end portion and mounting plate 2, while the upper springs 8 are disposed between the shaft end portion and coil bobbin 4a of magnetizing coil 4. Springs 7 and 8 act to hold the coil bobbin 4a pressed against downward projections 9a of stationary-contact mounting block 9 mounted on the upper open end of casing 1, and also to hold the stationary core 3 pressed against the bottom face of coil bobbin 4a.

Consequently, when magnetizing coil 4 is energized to move movable core 5 downwardly to strike stationary core 3, the latter is buffered downwardly by springs 7 tending to oscillate, but springs 8 act to absorb such oscillation, keeping the equilibrium. Since the opposite ends of supporting shaft 6 of stationary core 3 are in sliding engagement in guide grooves 1a, the strike of movable core 5 is correctly converted to sliding in longitudinal direction of grooves 1a.

In the upper portion of movable core 5 there is provided a supporting shaft 10 passing through the core in lamination direction, and towards the opposite ends of shaft 10 are mounted thereon supporter rods 11 with the shaft 10 penetrating through the bases 11a of rods 11.

The upper and lower portions of each rod 11, divided by base 11a, extend into recess 12a formed in the lower end of movable-contact supporter 12 and a recess 1c formed in the casing 1, respectively, and cooperate therewith through springs 13 and 14, respectively. The movable core 5 is supported upwards by spring 14, while the movable contact supporter 12 is supported upwards by spring 13. The spring 14 is the same in action as a ordinary movable-core supporting spring, while the spring 13 is used for increasing the opening distance of contacts in the interruption of short-circuit or other over current. A mounting rod 15 is mounted on movable core 5 at the upper face center with its base end embedded in the latter in the longitudinal direction, and with its base end portion in engagement with the supporting shaft 10 of movable core 5. As shown in FIG. 8, a rotor of cylindrical shape 16 is mounted on the mounting rod 15 from its upper end and is rotatable thereabout, and held in position by a pin 17 passing through the rod end. The rotor 16 is provided with a laterally extending pawl 16a at the upper end, and longitudinal wings 16b extending substantially the whole length of rotor 16 at the opposite sides at right angles to the pawl 16a. An engagement holding mechanism 18, is secured in a recess in supporter 12 and is, as shown in FIG. 9, provided with a pair of mounting pieces 18a extending outwardly therefrom, and a central bore 18b for rotatably receiving the rotor 16, with the bottom wall 18c to the left, the bore 18b having a diameter somewhat larger than the length from the center of rotor 16 to the outer end of wing 16b. The central bore 18b is open at the upper end for receiving the rotor 16, and is provided with a longitudinal opening 18d of appropriate width for projection therethrough of the pawl 16a. The bottom wall 18c is provided with a hole 18e to allow passing therethrough of rotor 16 except for the pawl 16a. When the rotor 16 is being inserted into the bore 18b from the upper side, it can be moved downwardly through the hole 18e only when the pawl 16a is positioned centrally of the opening 18d.

The relation between the rotor 16 and the body 18 can well be understood from FIGS. 6 to 7. In FIG. 6, the whole rotor 16 rides on the bottom wall 18c, while in FIG. 7, the pawl 16a rides on the bottom wall 18c with the principal portion of the rotor 16 extending downwardly from the bottom wall 18c. The extent of rotation of rotor 16 in the bore 18b is limited by the width of the longitudinal opening 18d as shown in FIG. 6. In the structure of FIG. 6, the portion of wall bore 18b opposite to the opening 18d is not formed cylindrical, because of the fact that the rotor 16 is not rotated beyond the width of opening 18d, and this enables the body 18 to be made with correspondingly decreased lateral thickness. Further, it will readily be understood that the number of wings 16b may be different than two, and they may not be in right angle relation with the pawl 16a. Although in the embodiment shown, the body 18 is fixed to the supporter 12, while the rotor 16 is secured to the movable core 5, they may relatively be reversed in mounting. That is to say, the body 18 may be fixed to the movable core 5, while the rotor 16 may be secured to the supporter 12. On the supporter 12 are resiliently mounted three movable contacts 19 by means of supporting rods 20, springs 21, plate springs 22, and supporting pins 23, respectively. These movable contacts 19 are, as shown in FIG. 2, to cooperate with two sets of three stationary contacts 25 and 26 of primary and secondary sides mounted on stationary-contact mounting block 9 in switching chambers defined by separators 24a depending from the cover member 24 for casing 1.

Over-current protective electromagnets 29 and thermal relays 31 are both disposed embedded in the space below stationary contacts 25 and 26, and stationary contacts 25 are connected to connection terminals 27 through magnetizing coils 30 of corresponding magnets 29, respectively, while stationary contacts 26 are connected to connection terminals 28 through thermal elements 31a of corresponding thermal relays 31, respectively. The thermal element 31a of each pole is, as shown in FIG. 3, constructed to operate contact of switch 33 shown by dotted lines, through link plate 32. The switches 33 or thermal relays 31 are provided with adjusting dial 34.

The over-current protective electromagnets 29, such as for short-circuit or other protection, are supported by mounting blocks 36 through yokes 35, and movable iron pieces 37 are in opposition to stationary iron pieces 39, respectively, and take strokes by means of springs 38 provided for the base ends of movable pieces 37, respectively. The respective forward ends of movable pieces 37 engage in cuts provided in a driving plate 40, which is loosely engaged in upper and lower grooves 41 and 42 for free movement in the direction of movement of movable pieces 37, that is, in the direction of cascading electromagnets. The pawl 16a of rotor 16 is also in engagement with driving plate 40 through a cut formed therein. The driving plate 40 is, as shown in FIG. 3, biased normally to the direction in which movable pieces 37 are moved away from stationary pieces 39, by means of spring 43 supported by spring receptacle 44. When movable pieces 37 are attracted to stationary pieces 39 for moving the driving plate 40 to the right in FIG. 3, the rotor 16 comes to the position shown in FIG. 7, where the rotor 16 drops through the bottom hole 18e of the body 18. When movable pieces 37 are in released positions as shown in FIG. 3, the rotor 16 is held in the position shown in FIG. 6, where rotor wings 16b are not in registration with the bottom hole 18e. The spring receptacle 44 is in screw-thread engagement with a dial 45, and the strength of spring 43 may be adjusted by rotation of the dial 45.

As shown in FIG. 2, the upper end of the middle pole among the three poles carries fixed thereto an indicator rod 46 for indicating tripping operation of the switch, by its upward shift through a central hole 24b in the cover 24. An inverted-cup-shaped button 48 is resiliently held by a spring 47 above the indicator rod 46, and is provided with a transparent window 48a, through which the indicator rod can be observed. The button 48 is provided with a pair of symmetrically formed recesses 48c having slant faces 48b, and a pair of movable rods 49 are held and longitudinally movable in bosses 24c and 24d formed inside the cover 24. The rods 49 are normally biased to have their inner ends in engagement with the recesses 48c, respectively, by means of springs 50 held between collars 49c on the rods and bosses 24d, respectively. When the inner ends of rods 49 are in engagement with the button 48 in recesses 48c, the outer ends 49b of rods 49 are not exposed to grooves 24e formed between the bosses 24d and the side wall of cover member 24.

A stationary rod 51 with its upper end formed with a hole 51b for free insertion therethrough of the outer end 49b of rod 49 is disposed in each groove 24e, and the lower end of each rod 51 is provided with a hole 51a through which the corresponding end of shaft 10 extends normally, whereby each rod 51 is held longitudinally. Auxiliary switches 52 are provided on opposite side walls of casing 1, and have movable-contact supporting pieces 54 with their upper ends in engagement with the corresponding ends of supporting shaft 10 of movable core 5. The auxiliary switches 52 have their contacts opened and closed along with downward movement of the movable core 5, and are provided with connection terminals 55, respectively. The supporting shaft 10 carries rollers 56 which are rotatable thereon and sandwiched between downward projections 9a of mounting block 9 for guiding the up and down movements of movable core 5. A spring 57 is disposed for damping the upward return movement of movable core 5, and also for balancing the gap between the core 5 and the mounting rod 15 during downward movement of the core 5. Side covers 58 cover the opposite end portions of movable-contact supporter 12. Thermal relays 31 are provided with connection terminals 59, and the arc-extinguishing chambers are formed by arc-extinguishing shelves 60, as usual.

Figure 1:
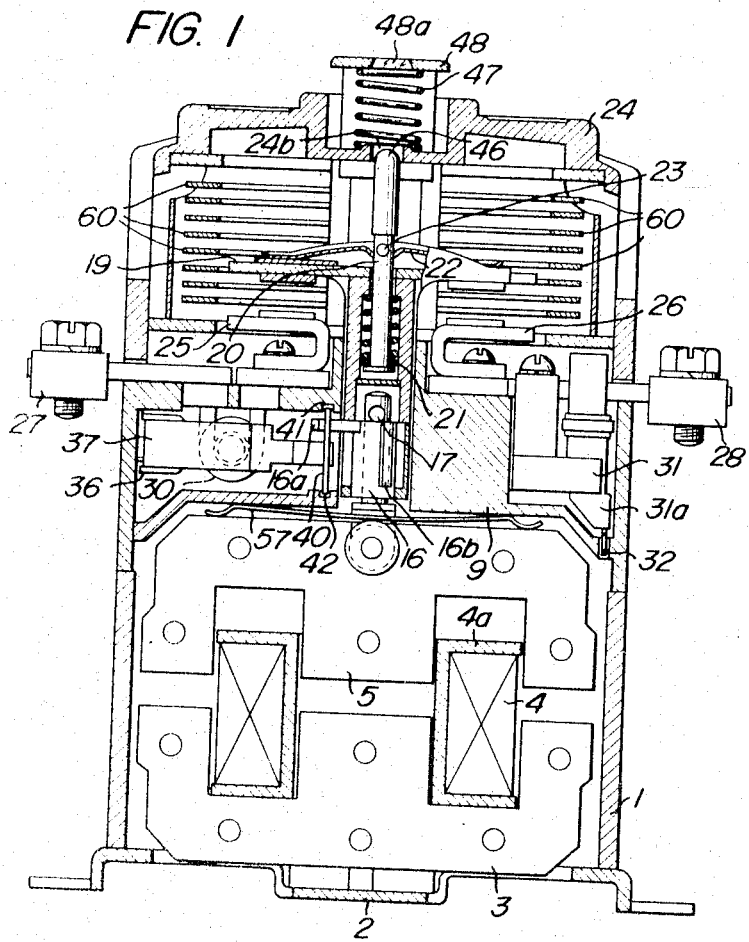
FIG. 1 is a front elevational view, partly in longitudinal section.

Normally, the switch of the present invention is in the state as shown in FIGS. 1 to 3, with the rotor 16 and body 18 in the relative positions shown in FIG. 6, and movable contacts 19 and stationary contacts 25, 26 opposing each other, respectively. In this condition, the driving plate 10 is urged by spring 43 to the left in FIG. 2, and consequently, the rotor 16 is held entirely on the bottom hole 18c, with wings 16b riding on the latter, and the movable-contact supporter 12 is held upward together with the movable core 5 by springs 13 and 14.

When the magnetizing coil 4 is energized, the movable-contact supporter 12 is attracted downwardly together with the movable core 5, and movable contacts 19 supported thereby bridge stationary contacts 25 and 26 for respective poles to close the circuit.

When the thermal elements 31a are operated under the above condition, the switch 33 is actuated by link plate 32, and the magnetizing coil 4 in series connection with switch 33 is deenergized. Then, spring 14 acts to return the movable core 5 upwardly to open the circuit. The above operation is repeated as in a switch of highly frequent operation.

When, however, short-circuit or other over current begins to flow through a protective electromagnet 29, the latter is operated to attract movable piece 37 to stationary piece 39, and the driving plate 40 is thereby shifted to the right in FIG. 3 against spring 43. As a result, the rotor 16 in engagement with the driving plate 10 is rotated in the clockwise direction in FIG. 6.

When the rotor 16 thus rotated has reached the center position shown in FIG. 7 relative to the body 18, the latter is moved upwardly by the strong force of now-released spring 13, that has been held compressed between the supporter 12 fixed to the body 18 and the movable core 5, the rotor 16 passing through the bottom hole 18e, until the pawl 16a abuts the bottom wall 18c. Movable contacts 19 thus move away from stationary contacts 25 and 26 at an extremely high speed to interrupt the circuit. As a result, the operating electromagnet having been self-held by closure of auxiliary switch 52 is deenergized by opening of auxiliary switch 52, and the movable core 5 returns upwardly by virtue of spring 14.

Thus, when an electromagnet 29 has operated, the distance of movement of movable core 5 away from stationary core is increased by the relative longitudinal movement of the rotor 16 and body 18 as shown in FIG. 7, resulting in remarkably enlarged open distance between the movable and stationary contacts. It should be understood that the switch becomes capable of interrupting over current, only when electromagnet 29 has operated.

FIG. 4 shows essential parts of the switch under the above condition. Although not shown in the drawings, a switch may be provided to be actuated by the operation of driving plate 40, and connected in series with magnetizing coil 4. In this case, since the magnetizing coil 4 is deenergized directly by operation of driving plate 40 upon occurrence of over current, the upward movement of supporter 12 by spring 13 and that of movable core 5 by spring 14 can be promptly added together for the interrupting operation.

When the switch has been interrupted as above described, the indicating rod 46 secured to the upper end of supporting rod 20 is moved upwardly together with supporter 12, as shown in FIG. 4, to extend above the central hole 24b of cover member 24. This can be observed through the peep hole 48a of push button 48 to confirm the interrupting operation.

When the abnormal state of the circuit has been removed, the switch may be returned to its normal operation. For this purpose, the reset push button 48 is pushed down as shown in FIG. 5. Directly before the resetting, the upper end shoulder of supporter 12 of central pole is in proximity with the lower end of push button 48. Consequently, when the push button is pressed down against the force of spring 47, the movable rods 49 are pushed outwardly by cooperation of their inner ends 49a and the slant faces 48b of recesses 48c. The outer ends 49b of respective rods 49 are thus caused to extend beyound respective bosses 24d into the holes 51b of respective stationary rods 51.

Consequently, the stationary rods 51 are held immovable, and their lower ends are holding the shaft 10 immovable by engagement with the opposite ends of the shaft 10 through holes 51a, the movable core 5 cannot be moved along with the depression of push button 48 urging the supporter 12 downwardly. As a result, the springs 13 interposed between supported 12 and movable core 5 are compressed to allow the downward movement of supporter 12. At this time, the rotor 16 and the body 18 are in the positions as shown in FIG. 7, and the rotor 16 is held stationary because of its fixture to the now stationary movable core 5. As a result, the body 18 secured to supporter 12 is moved down along with the supporter 12, and the rotor 16 extends upwardly relative to the body 18. On the other hand, the driving plate 40, being always urged to the left in FIG. 3, the rotor 16 is rotated to the position shown in FIG. 6, upon its complete withdrawal out of the bottom hole 18e of body 18. Consequently, if the push button 48 is released at this time, the compressed springs 13 tend to move the body 18 upwardly, but the rotor 16 prevents such an upward movement of body 18, and the switch is wholly reset in the state shown in FIGS. 1 to 3.

In the above-described resetting device, two movable rods 49 are provided under control of a single central push button, but separate push buttons may be provided for respective stationary rods 51, and the two push buttons may be interlinked for simultaneous operation. Resetting may also be effected by any known mechanism other than the illustrated example.

In low voltage circuits, load changes over wider ranges than in higher voltage circuits, and short-circuit or other over current should be interrupted more promptly. However, particularly for short-time over current, such as stating current of an electric motor, the tripping mechanism should not operate. In the embodiment illustrated, thermal relays of the bimetal type are incorporated, but in place of such thermal relays, those employing thermistors or ferrite magnets may be used. Alternatively, if the over-current protective electromagnets are replaced by oil-dash-pot devices, thermal may not be employed.

The illustrated embodiment is capable of remote control, but needless to say, the invention may be applied to manually operated electrical switches.

What is claimed is:

1. An electrical switch comprising cooperating stationary an dmovable contacts, an operating electromagnet having a movable core, supporter means for said movable contact and actuated by said electromagnet, a mechanism for releasably coupling said movable core with said supporter means, and over-current detecting means operative to release the coupling between said movable core and said supporter means upon occurrence of over-current through said contacts, characterized in that at the time of the normal opening and closing operation of said switch said supporter means and said movable core are operated by said operating electromagnet with the supporter and the movable core remaining as coupled by said mechanism, said mechanism releasing said coupling only upon occurrence of over-current in response to the operation of said over-current detecting means enabling the over-current interrupting operation of said switch, the opening distance from said stationary contacts to said movable contacts at the time of the over-current interrupting operation being larger than the opening distance from said stationary contacts to said movable contacts at the time of the normal opening and closing operation.

2. An electrical switch comprising cooperating stationary and movable contacts, an operating electromagnet having a movable core, supporter means for said movable contact and actuated by said electromagnet, a mechanism for releasably coupling said movable core with said supporter means, said mechanism comprising a mechanism body and a rotor respectively affixed to said supporter means and said movable core, and over-current detecting means operative to release the coupling between said movable core and said supporter means by actuating said rotor upon occurrence of over-current through said contacts, characterized in that at the time of the normal opening and closing operation of said switch said supporter means and said movable core are operated by said operating electromagnet with the supporter and the movable core remaining as coupled by said mechanism, said mechanism releasing said coupling only upon occurrence of over-current in response to the operation of said over-current detecting means enabling the over-current interrupting operation of said switch.

3. An electrical switch comprising a cover member, cooperating stationary and movable contacts, an operating electromagnet having a movable core, supporter means for said movable contact and actuated by said electromagnet, an indicator member for said supporter means, a mechanism for releasably coupling said movable core with said supporter means, and over-current detecting means operative to release the coupling between said movable core and said supporter means upon occurrence of over-current through said contacts, characterized in that at the time of the normal opening and closing operation of said switch said supporter means and said movable core are operated by said operating electromagnet with the supporter and the movable core remaining as coupled by said mechanism, said mechanism releasing said coupling only upon occurrence of over-current in response to the operation of said over-current detecting means enabling the over-current interrupting operation of said switch, said indicator member approaching the surface of said cover member only at the time of the over-current interrupting operation under control of a difference between the opened position of said movable contacts at the time of the normal opening and closing operation and the interrupted position of said movable contacts at the time of the over-current interrupting operation, whereby the indication thereof is effected only at the time of the over-current interrupting operation.

References Cited by the Examiner
UNITED STATES PATENTS

| | | | |
|---|---|---|---|
| 1,582,987 | 5/1926 | Hart | 200—98 |
| 2,382,022 | 8/1945 | Perret. | |
| 2,897,408 | 7/1959 | Kesselring et al. | 200—106 X |

BERNARD A. GILHEANY, *Primary Examiner.*

J. BAKER, *Assistant Examiner.*